(12) United States Patent
Siddiq et al.

(10) Patent No.: US 10,672,390 B2
(45) Date of Patent: Jun. 2, 2020

(54) SYSTEMS AND METHODS FOR IMPROVING SPEECH RECOGNITION PERFORMANCE BY GENERATING COMBINED INTERPRETATIONS

(71) Applicant: Rovi Guides, Inc., Santa Clara, CA (US)

(72) Inventors: Abubakkar Siddiq, Methuen, MA (US); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/578,843

(22) Filed: Dec. 22, 2014

(65) Prior Publication Data

US 2016/0180840 A1   Jun. 23, 2016

(51) Int. Cl.
*G10L 15/18* (2013.01)
*H04N 21/422* (2011.01)
*H04N 21/482* (2011.01)

(52) U.S. Cl.
CPC ... *G10L 15/1815* (2013.01); *H04N 21/42203* (2013.01); *H04N 21/4828* (2013.01)

(58) Field of Classification Search
CPC .................. G10L 15/1815; H04N 21/42203
USPC ........................................ 704/246, 4, 9, 2
See application file for complete search history.

(56) References Cited

U.S. PATENT DOCUMENTS

| | | | |
|---|---|---|---|
| 5,321,607 A * | 6/1994 | Fukumochi | G06F 17/271 704/4 |
| 6,567,778 B1 | 5/2003 | Chao Chang et al. | |
| 7,493,257 B2 | 2/2009 | Kim et al. | |
| 7,747,437 B2 | 6/2010 | Verhasselt et al. | |
| 7,856,351 B2 | 12/2010 | Yaman et al. | |
| 8,650,031 B1 * | 2/2014 | Mamou | G10L 15/08 704/235 |
| 8,868,409 B1 * | 10/2014 | Mengibar | G10L 15/26 704/10 |
| 2005/0021331 A1 * | 1/2005 | Huang | G10L 15/1815 704/231 |
| 2005/0055209 A1 * | 3/2005 | Epstein | G10L 15/1815 704/255 |
| 2005/0055217 A1 * | 3/2005 | Sumita | G06F 17/2818 704/277 |
| 2005/0075859 A1 * | 4/2005 | Ramsey | G06F 17/2715 704/9 |
| 2007/0011133 A1 * | 1/2007 | Chang | G06F 17/30864 |
| 2007/0203688 A1 * | 8/2007 | Fuji | G06F 17/28 704/2 |

(Continued)

FOREIGN PATENT DOCUMENTS

WO   WO-0051106 A1   8/2000

*Primary Examiner* — Akwasi M Sarpong
(74) *Attorney, Agent, or Firm* — Haley Guiliano LLP

(57) ABSTRACT

The systems and methods disclosed herein combine a plurality of interpretations of a voice-based input. The systems and methods may receive the voice-based input, process it using one or more automatic speech recognition modules to obtain a plurality of interpretations, and identify an entity set for each of the plurality of interpretations. The systems and methods may further generate a combined interpretation based on a first interpretation and second interpretation selected form the plurality of interpretations and assign a semantic score to the combined interpretation based on the entity sets of the first and second interpretation.

16 Claims, 6 Drawing Sheets

(56) References Cited

U.S. PATENT DOCUMENTS

2010/0205198 A1* 8/2010 Mishne ............... G06F 16/3346
707/759
2011/0161347 A1* 6/2011 Johnston ................ G06F 16/84
707/769

* cited by examiner

US 10,672,390 B2

SYSTEMS AND METHODS FOR IMPROVING SPEECH RECOGNITION PERFORMANCE BY GENERATING COMBINED INTERPRETATIONS

BACKGROUND OF THE DISCLOSURE

Entertainment systems often utilize speech recognition techniques in order to support processing user queries in their natural language and to provide a smoother user interface. For example, instead of a user manually searching for Tom Cruise movies by selecting an "actor" search option and typing "Tom Cruise" using a keyboard, the user may simply say "Show me Tom Cruise movies." An interactive media guidance application may recognize the query using speech and/or voice recognition techniques, parse the words, and interpret the meaning of the query using syntactic and semantic information. However, traditional speech recognition techniques are limited to processing a single recognition hypothesis of a search query generated by an automatic speech recognition module. The single recognition hypothesis may contain errors and mischaracterize the user input, which can lead to erroneous search results or propagate to other system components that make use of the erroneous recognition hypothesis.

SUMMARY

Accordingly, systems and methods are described herein for combining a plurality of interpretations (e.g., transcription hypotheses) of a voice-based input. In some aspects, the systems and methods may receive a voice-based input and process it using one or more automatic speech recognition modules to obtain the plurality of interpretations of the voice-based input. In some implementations, a single automatic speech recognition module may generate all of the plurality of interpretations, while in other implementations, each of a plurality of automatic speech recognition modules may generate a single interpretation of the voice-base input. As referred to herein, the term "interpretation" should be understood to mean a transcription hypothesis of the voice-based input. For example, based on the voice-based input, the systems and methods may derive several candidate transcriptions, each of which corresponds to a list of words that has a high likelihood of accurately transcribing the voice-based input. Each of the candidate transcriptions may be an "interpretation" of the voice-based input. The systems and methods may further process each of the plurality of interpretations to identify respective entity sets. Each entity set may associate entities with portions of the interpretations, such as with individual words, that may have special meaning. Each interpretation may include multiple such entities. The systems and methods may then generate a combined interpretation based on a first interpretation and a second interpretation, both selected from the plurality of interpretations, and may assign a semantic score of the combined interpretation based on the entity sets of the first interpretation and the second interpretation.

For example, a user may search for movies starring the actors Tom Cruise and Nicole Kidman, and may accordingly provide the search query "Show me movies with Tom Cruise and Nicole Kidman" as voice-based input. The systems and methods may process the voice-based input using one or more speech recognition modules to obtain a plurality of interpretations. For example, two automatic speech recognition modules may be used that are optimized for different types of speakers (e.g., speakers from different geographical regions). In other embodiments, the plurality of interpretations may be generated by a single automatic speech recognition module and may correspond to an ordered list of transcription hypotheses ranked in decreasing order of likelihood of matching the voice-based input.

Based on the plurality of interpretations, the systems and methods may identify entity sets for each of the plurality of interpretations. For example, a first interpretation may contain the words "Tom Cruise," which may be identified by the systems and methods as corresponding to an actor name. Similarly, a second interpretation may contain the name "Nicole Kidman," which may likewise be identified by the systems and methods as corresponding to an actress. In some aspects, the systems and methods may further determine one or more entities that capture an intent of the voice-based input, such as "performing a search." For example, the phrase "show me movies with" may be interpreted by the systems and methods as a command to initiate a search based on entities contained in the plurality of interpretations.

In some aspects, the systems and methods may further generate a combined interpretation from a first interpretation and a second interpretation, both selected from the plurality of interpretations. For example, as discussed in the preceding paragraph, the voice-based input may correspond to "Show me movies with Tom Cruise and Nicole Kidman"; but the first interpretation may not correctly recognize the name Nicole Kidman (e.g., by making a transcription error such as "Nicole Kitman"). Similarly, the second interpretation may not correctly recognize the name Tom Cruise (e.g., by making a transcription error such as "Tom Cruze"). In some aspects, the transcription errors in the first and second interpretations may propagate to other system components and cause further errors such as inaccurate search results. In order to avoid such errors, the systems and methods may combine the first interpretation and the second interpretation to generate a combined interpretation. In some aspects, the combined interpretation may be composed of entities from the first interpretation and the second interpretation. For example, "Tom Cruise," as properly recognized in the first interpretation, may be combined with "Nicole Kidman," as properly recognized in the second interpretation. The interpretation may further include the phrase "Show me movies with," which may have been properly recognized by both the first interpretation and the second interpretation. Similarly, the systems and methods may also generate other combined interpretations, such as by combining the incorrectly interpreted names "Tom Cruze" and "Nicole Kitman."

In some aspects, the systems and methods may further assign a semantic score to the combined interpretation based on the entity set of the first interpretation and the entity set of the second interpretation. For example, combined interpretations may be assigned a semantic score by determining whether the corresponding entities are related and whether they are consistent with the intent attributed to the voice-based input (e.g., performing a search for movies). In some aspects, the systems and methods may determine that two entities are related if these entities are connected in a knowledge graph. A knowledge graph may represent entities as nodes in a graph and may connect related entities by so-called edges. The edges may further be associated with weights to determine whether there is a strong or weak interrelation between the entities. For example, the entities "Tom Cruise" and "Nicole Kidman" may be connected in a knowledge graph because both of them are actors. In some implementations, the association between these two entities may be determined to be relatively strong because Tom Cruise and Nicole Kidman are not only actors but have appeared together in several movies. By contrast, actors who have not appeared in common movies may be associated with a comparably weak connection in the knowledge graph.

In some aspects, the semantic score assigned by the systems and methods to the combined interpretation may depend on an intent associated with the first interpretation or the second interpretation. For example, a combined interpretation that is associated with the intent of searching for a movie may be deemed consistent with two actor names but not consistent (or consistent to a lesser degree) with names of sports players. Accordingly, in some aspects, the systems and methods may assign a higher semantic score when entities of the combined interpretation match an intent associated with the combined interpretation, whereas a lower semantic score may be assigned otherwise.

In some aspects, the systems and methods may further assign a semantic score to at least one of the first interpretation and the second interpretation and select one of the combined interpretation, the first interpretation, and the second interpretation based on comparing the semantic score of the combined interpretation, the first interpretation, and the second interpretation. For example, in some cases, the first interpretation may not contain any transcription errors, but the second interpretation may contain some. Accordingly, the combined interpretation may also contain some transcription errors because it combines entities from the first interpretation and the second interpretation. In this example, the systems and methods may select the first interpretation because it correctly recognized the voice-based input. In some aspects, the systems and methods may reach this determination by comparing the semantic scores of the combined interpretation, the first interpretation, and the second interpretation. In this example, the first interpretation should be associated with the highest semantic score because it properly recognized all entities and therefore accurately captures the voice-based input received from the user. On the other hand, the second interpretation and the combined interpretation may both contain at least one incorrectly recognized entity and may therefore be associated with a lower semantic score.

In some aspects, the systems and methods may assign the semantic score to the combined interpretation by counting the number of entities that are common to both the first interpretation and the second interpretation. For example, in connection with the previous example in which the voice-based input corresponded to "show me movies with Tom Cruise and Nicole Kidman," both the first interpretation and the second interpretation may have correctly recognized the actor name "Tom Cruise." Accordingly, a combined interpretation that includes the entity "Tom Cruise" may receive a higher semantic score compared to the case in which only the first interpretation contained "Tom Cruise" but the second interpretation contained "Tom Cruze." In other words, the systems and methods may assign a higher semantic score when the first and second interpretations contain a common entity, because the fact that the entity is contained in multiple interpretations may be viewed as an indication that the entity has likely been recognized correctly.

In some aspects, the systems and methods may determine a semantic score of the combined interpretation based on comparing at least one entity in the entity set of the first interpretation or the second interpretation with an entity derived from contextual information. For example, the systems and methods may maintain contextual information (e.g., a context state) based on previous inputs or actions taken by the user. For example, prior to providing the voice-based input, the user may have searched for movies that are showing that night, and the user may have been presented with a list of matching media assets. In order to narrow down the list, the user may then have provided a voice-based input such as "Tom Cruise and Nicole Kidman" to narrow down the search results to media assets that include both actors. In this example, the user intent of searching for media assets may be inferred from previous user actions or inputs and may be derived from the context in which the voice-based input was provided. Similarly, the actor names Tom Cruise and Nicole Kidman may be provided in separate voice-based inputs. For instance, a search for Tom Cruise movies may be initiated at a first time, and, accordingly, the entity "Tom Cruise" and the intent of searching for movies may be saved as contextual information. If a user subsequently provides the voice-based input "Nicole Kidman," the systems and methods may generate combined interpretations that not only include entities derived from the voice-based input (e.g., "Nicole Kidman"), but also use entities associated with the context state (e.g., "Tom Cruise" and "searching for movies").

In some aspects, the first interpretation and the second interpretation may be obtained from a single automatic speech recognition module. For example, the automatic speech recognition module may determine a plurality of different transcription hypotheses as part of its operation, and it may rank these transcription hypotheses according to their likelihood of matching the voice-based input. For instance, in some aspects, the automatic speech recognition module may use stochastic models such as Hidden Markov Models (HMMs) or Support Vector Machines (SVMs) to determine a plurality of transcription hypotheses (e.g., the plurality of interpretations).

In some aspects, the first interpretation may be generated by a first automatic speech recognition module and the second interpretation may be generated by a second automatic speech recognition module. For example, the first automatic speech recognition module may be trained to perform better for speakers with a certain dialect or for speakers from a certain region or country. For instance, the first automatic speech recognition module may perform better for speakers of American English whereas the second automatic speech recognition module may perform better for British English speakers. In another example, the first and second automatic speech recognition modules may be optimized for different acoustic environments. For example, the first automatic speech recognition module may perform well when there is a large degree of background noise, whereas the second automatic speech recognition module may be optimized for environments with little or no background noise.

In some aspects, the systems and methods may assign a semantic score to the combined interpretation based on comparing at least one entity in the entity set of the first interpretation or the second interpretation with an entity associated with a user profile. For example, the systems and methods may store a list of entities that match a specific user's interests (e.g., a sports team such as the New York Yankees). Accordingly, a first interpretation that contains the entity "New York Yankees" may be assigned a higher semantic score than a second interpretation that misinterpreted "New York Yankees" as "New York Yuppies."

In some aspects, the systems and methods may receive a user selection that identifies a final interpretation, wherein the final interpretation is one of the first interpretation, the second interpretation, and the combined interpretation. For example, the systems and methods may display a list of interpretations ranked by their respective semantic scores.

The systems and methods may then receive a user selection that identifies the interpretation that the user intended. Further processing may then be based on the selected interpretation. In some aspects, the systems and methods may automatically perform further processing based on the interpretation with the highest semantic score, such as by automatically performing a search for media assets based on the interpretation with the highest semantic score. In this example, the systems and methods may automatically display the list of search results together with a ranked list of the interpretations. In this way, if the search was based on an incorrect interpretation of the voice-based input, the user may select another interpretation, based on which the systems and methods may carry out an additional search.

BRIEF DESCRIPTION OF THE DRAWINGS

The above and other objects and advantages of the disclosure will be apparent under consideration of the following detailed description, taken in conjunction with the accompanying drawings, in which like reference characters refer to like parts throughout, and in which.

DESCRIPTION

Figure 1:
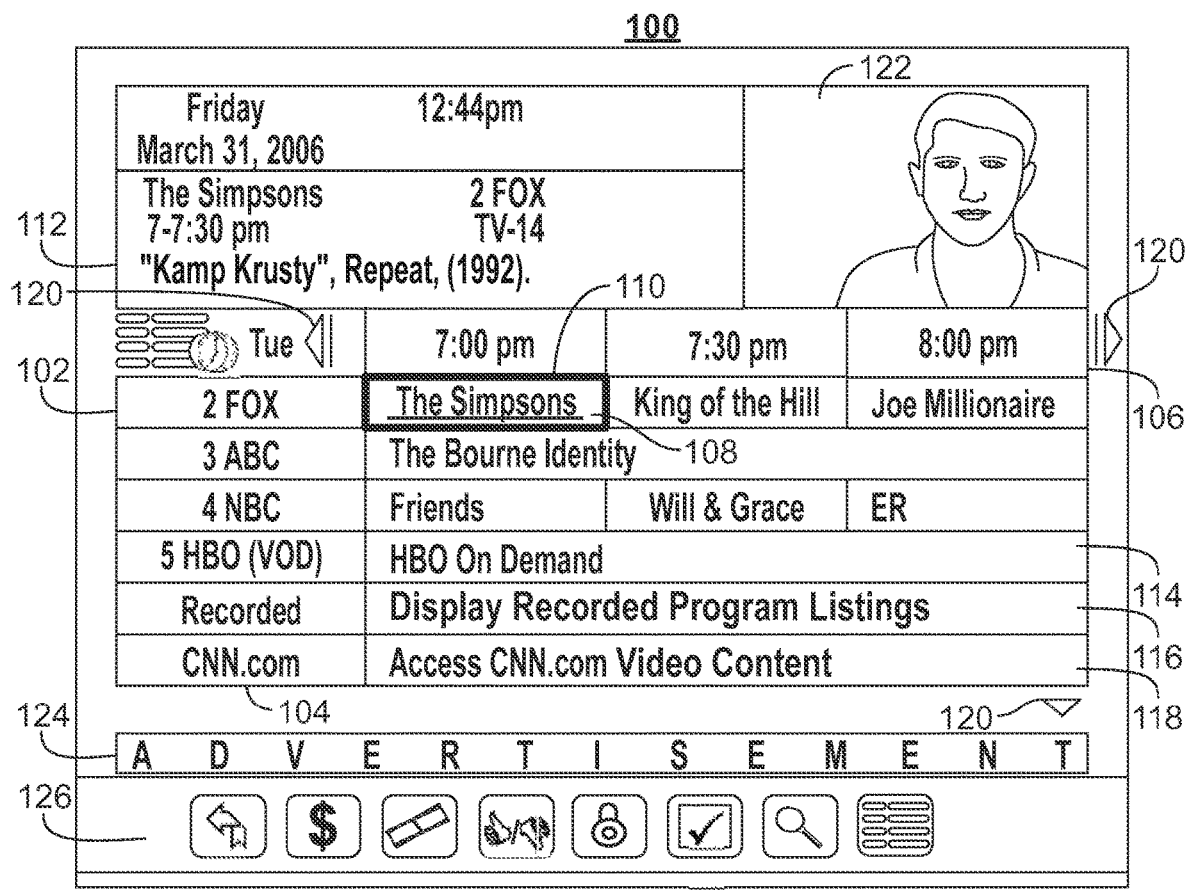
FIGS. 1 and 2 show illustrative display screens that may be used to provide media guidance application listings in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
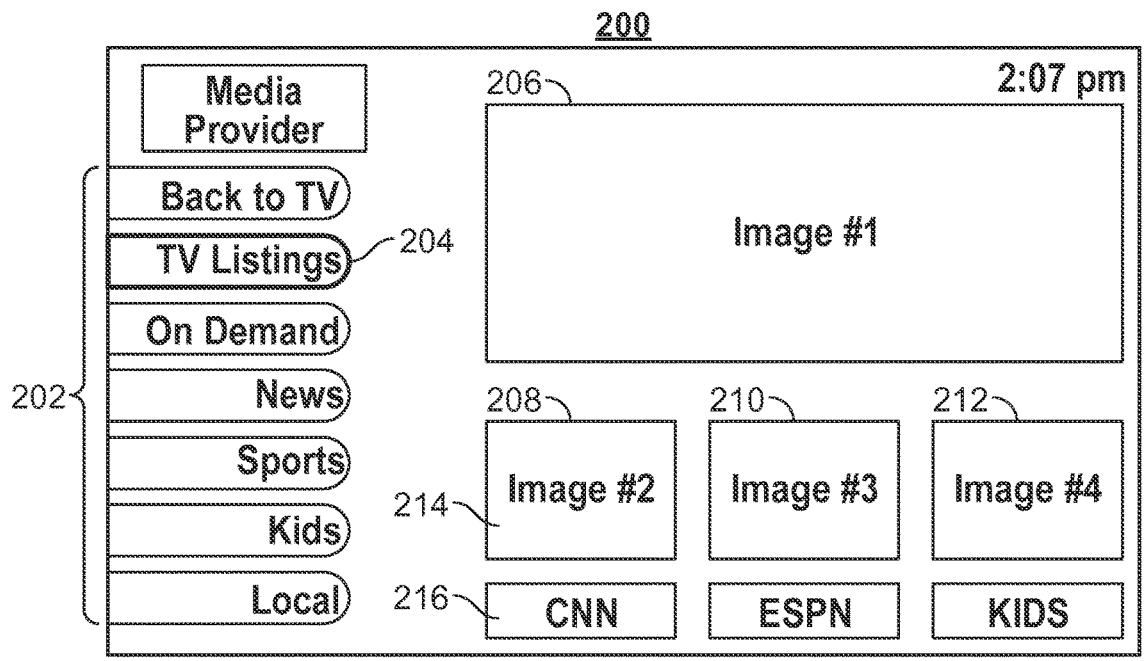

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
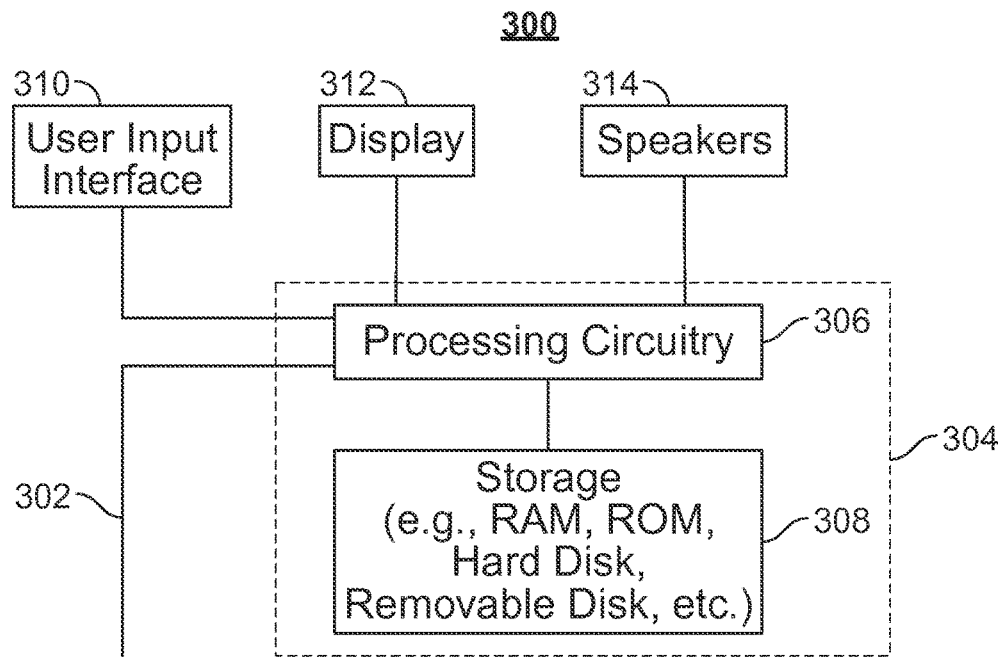
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
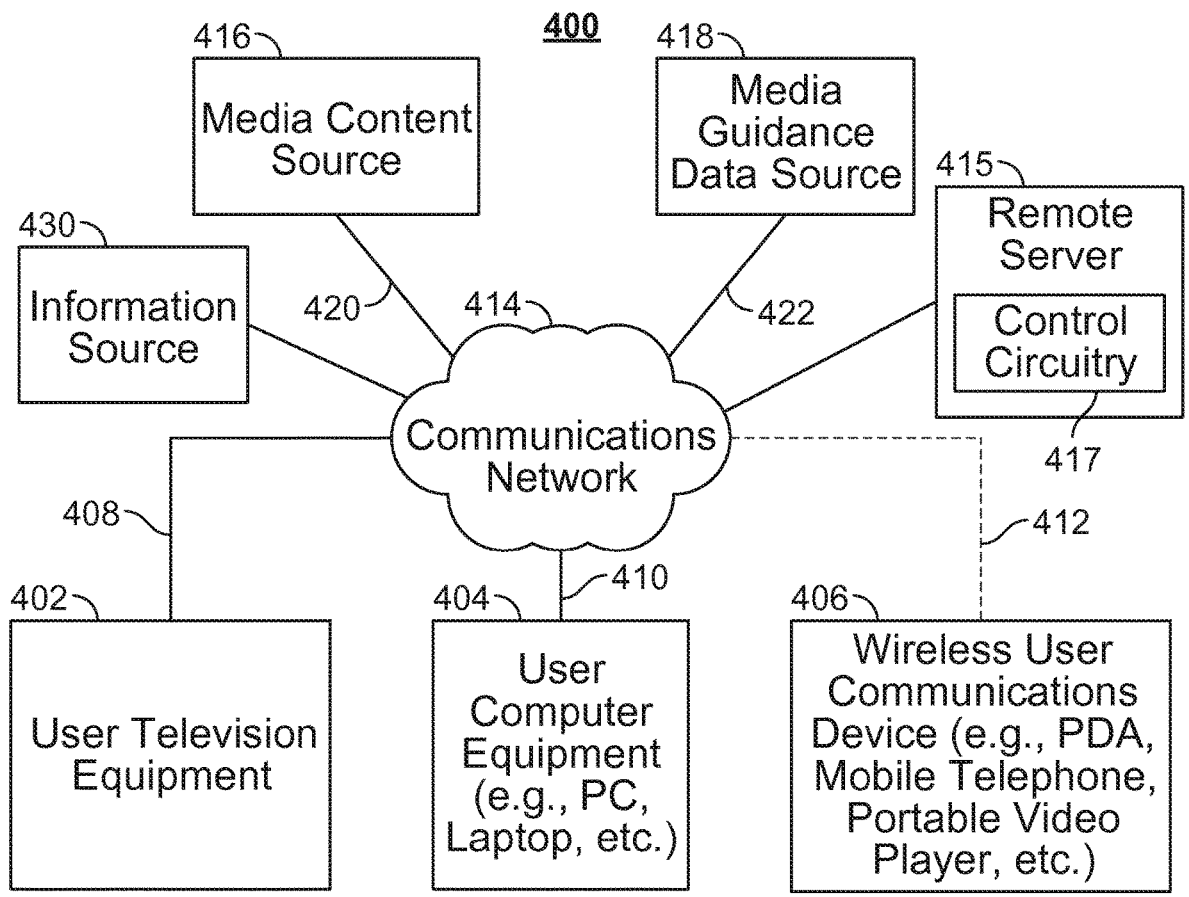
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server 415. For example, media guidance applications may be implemented partially as a client application on control circuitry 304 of user equipment device 300 and partially on a remote server 415 as a server application (e.g., media guidance data source 418) running on control circuitry 417 of remote server 415. When executed by control circuitry 417 of the remote server (such as media guidance data source 418), the media guidance application may instruct the control circuitry 417 to generate the guidance application displays and transmit the generated displays to the user equipment devices. The server application may instruct control circuitry 417 of the media guidance data source 418 to transmit data for storage on the user equipment. The client application may instruct control circuitry 304 of the receiving user equipment to generate the guidance application displays.

In some embodiments, the server application executed by control circuitry 417 of remote server 415 may be a context classification application that determines contextual information related to searches performed by a user. The contextual information may include, but need to be limited to, search queries submitted by a user, identifiers assigned to such search queries, and metadata related to search queries. The contextual information may further include user input, submitted in response to previous searches, that confirms or rejects contextual information attributed to the previous searches by the user equipment device. For example, if a user previously determined that a first and a second search query should be merged, that confirmation may be stored as contextual information together with the search queries. Similarly, the contextual information may further include instances in which a user determined that two search queries should be disassociated.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
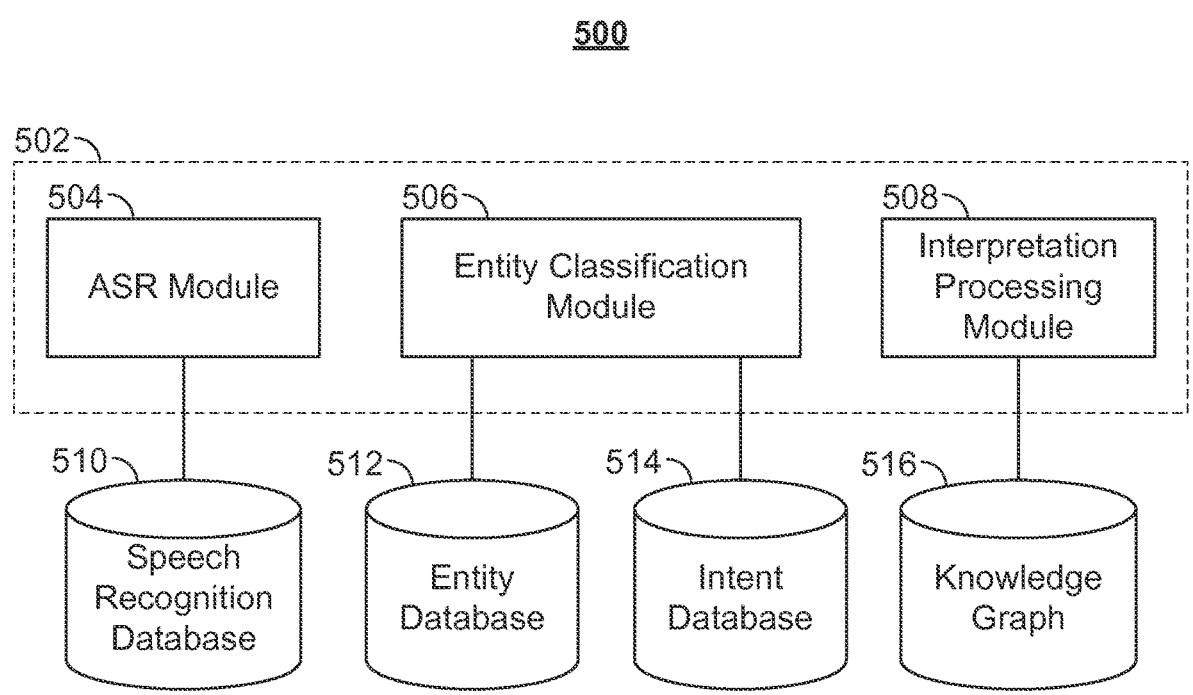
FIG. 5 is an illustrative block diagram of an interactive media system for combining a plurality of interpretations of a voice-based input, in accordance with some embodiments of the present disclosure.

FIG. 5 is an illustrative block diagram of an interactive media system 500 for combining a plurality of interpretations of a voice-based input, in accordance with some embodiments of the present disclosure. Interactive media system 500 may comprise several components that are located on remote server 502. Remote server 502 may be remote server 415, as shown in relation to FIG. 4, with control circuitry 417. In some embodiments, remote server 502 may host several components to perform automatic speech recognition of a voice-based input to obtain a plurality of interpretations, classify entities contained in the plurality of interpretations, and process the interpretations based on a semantic score derived based on the entities. For example, remote server 502 may include automatic speech recognition module 502, entity classification module 506, and interpretation processing module 508. As referred to herein, operations performed by automatic speech recognition module 504, entity classification module 506, and interpretation processing module 508 should be understood to mean operations that are executed by control circuitry 417. For example, automatic speech recognition module 504 may be installed on remote server 502 or 415 as a piece of software code. Control circuitry 417 may then execute the software corresponding to automatic speech recognition module 504 to carry out the functionality assigned to automatic speech recognition module 504 (e.g., to perform automatic speech recognition of speech input).

Automatic speech recognition module 504 may be an application that receives a speech segment as voice-based input (e.g., in the form of an audio file or a similar digital representation) and generates a text string as output that captures the context of the speech segment. In some embodiments, automatic speech recognition module 504 may receive the speech segment from remote server 502, which in turn may receive the speech segment from control circuitry 304. In some embodiments, automatic speech recognition module 504 may be connected to speech recognition database 510 that stores the vocabulary of a language spoken by a user (e.g., English). Speech recognition database 510 may further include a vocabulary of reserved words that represent commands available to the user. For example, the word "command" may be reserved and represent the beginning of a command that is available to the user. For example, the word "command" followed by "search" may indicate that the user intends to perform a search of media assets.

Entity classification module 506 may be responsible for assigning entities to the plurality of interpretations generated by automatic speech recognition module 504. In some embodiments, entity classification module 506 may identify keywords associated with the plurality of interpretations, for example, by using entity database 512. Entity database 512 may contain listings of keywords or entities that frequently occur in interpretations generated by automatic speech recognition module 504. Entity database 512 may also contain rules that may be used by entity classification module 506 for extracting entities or keywords from the plurality of interpretations. For example, one rule may specify when articles such as "the" and "a" may be deleted. Another rule may specify words that are should not be designated entities because their meaning is clear from context or because these words do not add additional information. For instance, the words "the" and "actor" in the interpretation "the actor Tom Cruise" may be removed because they may not carry additional information.

In response to identifying keywords from the plurality of interpretations, entity classification module 506 may assign entities to the interpretations. In some aspects, entity classification module 506 may select the entities from a predefined set of candidate entities. The entities included in the candidate set may have a varying degree of specificity. For example, in a first embodiment, entities may have a one-to-one correspondence with the words contained in the plurality of interpretations (e.g., "Tom Cruise"). In a second embodiment, the entities may further be assigned identifiers that correspond to generalizations of the entities assigned to the interpretations. For example, these more general identifiers may include "actor," "genre," "channel/program," "title," "producer," and "show time." Other suitable identifiers that are typically included in media asset metadata may also be included. Entity classification module 506 may assign such relatively broad terms because these terms may provide appropriate contextual information based on which a semantic score may be assigned. For instance, if a user is looking for media assets that feature the actor Tom Cruise, then the identifier actor may broadly capture the context within which the user has issued the voice-based input. Similarly, if control circuitry 304 receives a voice-based input that corresponds to a command to search for media assets with a start time in the evening (e.g., in response to receiving the voice-based input "what's on this evening?"), the identifier start time may broadly capture the context of the voice-based input and its corresponding plurality of interpretations.

Entity classification module 506 may further be connected to intent database 514. Similar to entity database 512, intent database 514 may be responsible for assigning intents to the plurality of interpretations generated by automatic speech recognition module 504. Intent database 514 may contain listings of keywords or intents that frequently occur in interpretations generated by automatic speech recognition module 504. Intent database 514 may also contain rules that be used by entity classification module 506 to extract intents from the plurality of interpretations. In some aspects, entity classification module 506 may select intents from a predefined set of candidate intents. The intents included in the candidate set may have a varying degree of specificity. For example, in a first embodiment, the intent may classify broadly a kind of action that the user intends to perform, such as searching for a media asset, scheduling a recording, locating information about a currently playing media asset, etc. In other embodiments, the intent may have a greater degree of specificity and may include genre, channel/program, or time information.

Interpretation processing module 508 may be responsible for assigning semantic scores to interpretations. In some aspects, interpretation processing module 508 may be connected to knowledge graph 516, which may store relational information about entities contained in the interpretation. For example, if a first entity is connected to a second entity in the knowledge graph, this may imply that the two entities are related and that a higher semantic score should be assigned. In some embodiments, interpretation processing module 508 may assign semantic scores both to interpretations contained in the plurality of interpretations and to combined interpretations that are generated from a first interpretation and a second interpretation. For instance, interpretation processing module 508 may assign a semantic score to interpretations by evaluating whether entities in the interpretation's entity set are related to one another. Interpretation processing module 508 may further assign a semantic score to a combined interpretation by determining whether entities in the first interpretation's entity set are related to entities in the second interpretation's entity set.

Figure 6:
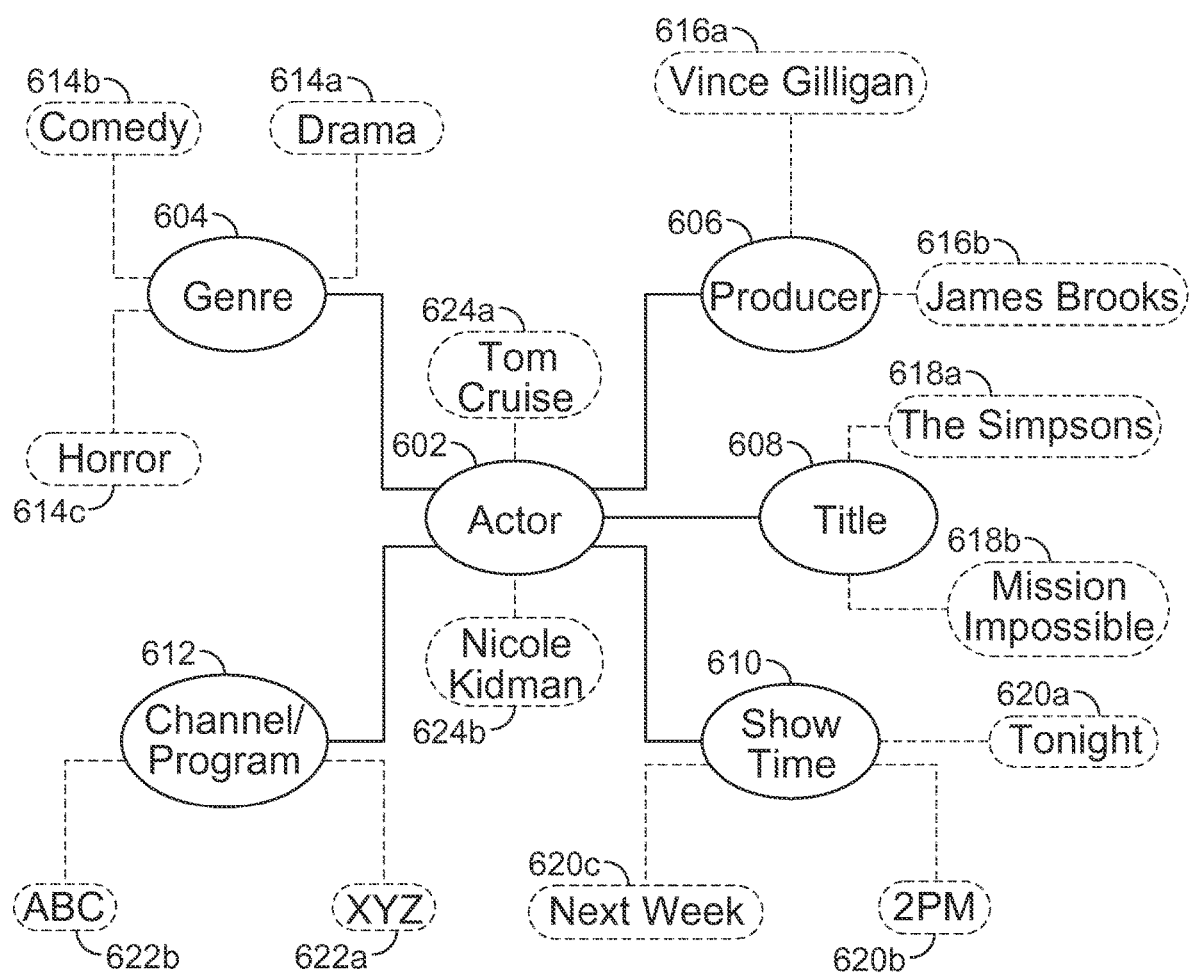
FIG. 6 shows a knowledge graph that illustrates contextual information used for determining whether to merge search queries, in accordance with some embodiments of the disclosure.

FIG. 6 shows a knowledge graph 600 that represents contextual information used in determining whether to combine a plurality of interpretations of a voice-based input, in accordance with some embodiments of the present disclosure. Knowledge graph 600 may consist of a possibly large number of entities that are represented as nodes in the graph. For example, knowledge graph 600 may contain, among others, nodes 602, 604, 606, 608, 610, and 612. The nodes of knowledge graph 600 may be connected by edges, and the presence of an edge in the graph may represent that there is an association between the entities represented by the nodes in the graph. For example, the edge connecting node 602 (i.e., "actor") with node 608 (i.e., "title") may illustrate the availability of contextual information between a media asset's title and actors' features in the media asset. In some implementations, an edge in knowledge graph 600 denotes that an association between the two entities connected by the edge is present. Conversely, the absence of an edge in knowledge graph 600 between two entities may denote that no association exists. For example, nodes 602 and 604 may be connected by an edge, illustrating that an entity related to a genre of a media asset is likely to come up in a similar context as another entity related to an actor being featured in the media asset. Accordingly, control circuitry 304 may determine, based on the presence of an edge between nodes 602 and 604, that if an interpretation contains entities related to a genre of a media asset and an actor featured in the media asset, that interpretation should be assigned a higher semantic score than in the absence of an edge between nodes 602 and 604.

Similarly, control circuitry 304 may determine that two entities are likely not associated with the same context when two nodes are not connected by an edge in knowledge graph 600. For example, as shown in FIG. 6, node 604 and node 612 are not connected by an edge in knowledge graph 600, because it may be unlikely that a search related to a genre of a media asset is associated with the same context as a search related to a channel or program associated with the media asset. Accordingly, because there is no edge between nodes 604 and 612, if a combined interpretation contains entities corresponding to a genre of a media asset and a channel/program of a media asset, respectively, control circuitry 304 may determine that a lower semantic score should be assigned than in the case where these nodes are connected.

In other implementations, although not shown in FIG. 6 to avoid overcomplicating the drawing, an edge between two entities in the knowledge graph may be associated with a weight (e.g., a real number, possibly normalized to a predefined interval) that reflects how likely the nodes connected by the edge are to be associated in a given context. For example, a relatively high weight may serve as an indication that there is a strong link between the nodes connected by the edge. Conversely, a relatively low weight may indicate that there is only a weak association between the nodes connected by the edge.

In some aspects, knowledge graph 600 may include nodes of various degree. For example, knowledge graph 600 may include nodes of a first degree, such as nodes 602-612, and nodes of a second degree, such as nodes 614-622. Nodes of a first degree may correspond to broad categories, such as "actor," "genre," "producer," "title," "show time," and "channel/program." Nodes of a second degree may correspond to terms with a more narrow meaning, such as specific instances that fall under the broad categories represented by the first degree nodes. For example, "actor" node 602 may be connected with node 624a ("Tom Cruise") and node 624b ("Nicole Kidman"). Node 602 may be connected with many more nodes, even though only nodes 624a and 624b are shown in FIG. 6 to avoid overcomplicating the drawing. Similarly, "title" node 608 may be connected with node 618a ("The Simpsons"), node 618b ("Mission Impossible"), and other nodes (not shown). In some embodiments, each of the second degree nodes may be connected to only a single first degree node, which may result in a structured graph that is more easily traversed by control circuitry 304 when a search needs to be performed. Alternatively, second degree nodes may be connected to more than a single first degree node, e.g., to accommodate cases in which the concept represented by the second degree may need to be associated with more than a single first degree node (e.g., a person who is both an actor and a producer).

Figure 7A:
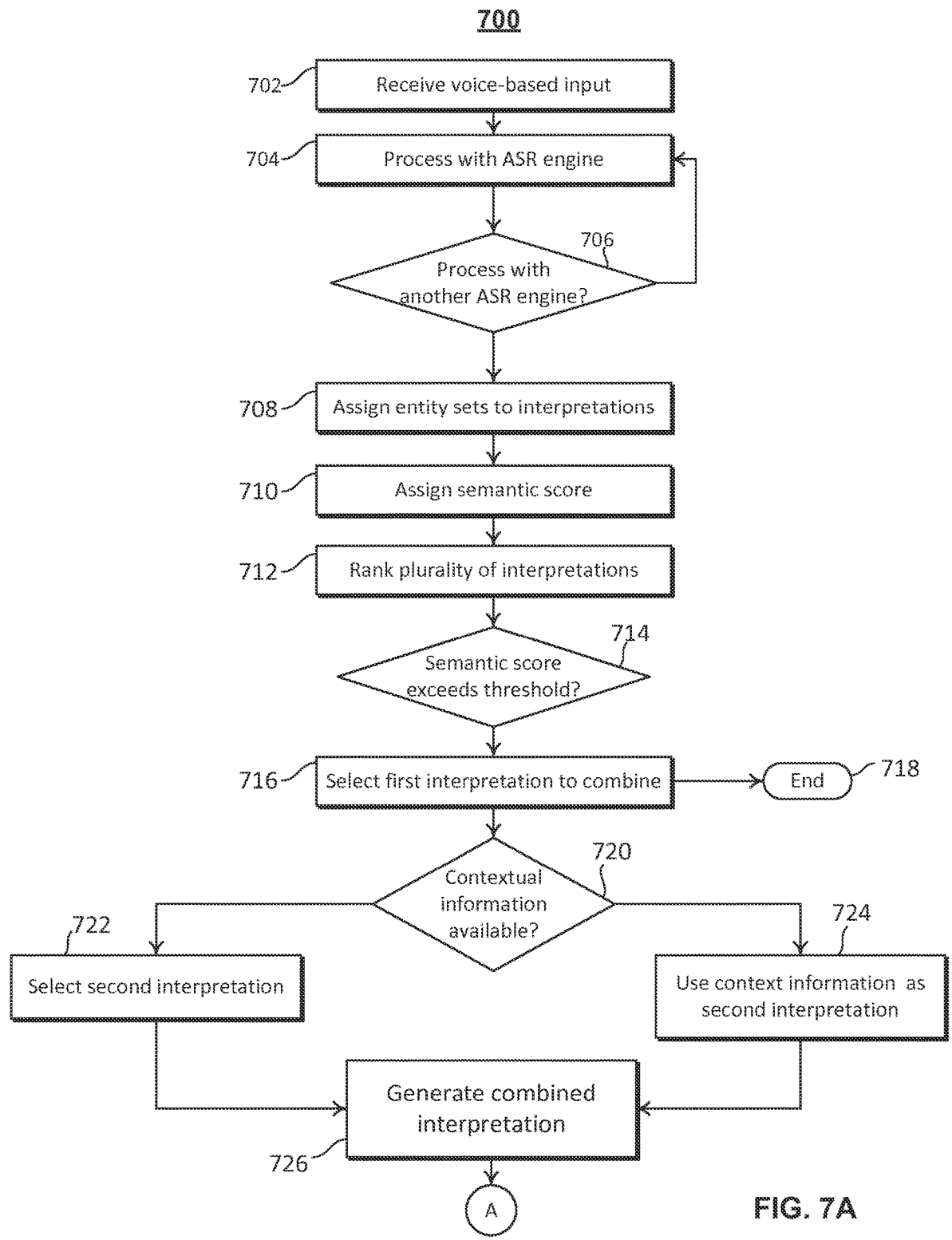
FIGS. 7A and 7B show a flow chart of a process including illustrative steps involved in combining a plurality of interpretations of a voice-based input, in accordance with some embodiments of the present disclosure.
Figure 7B:
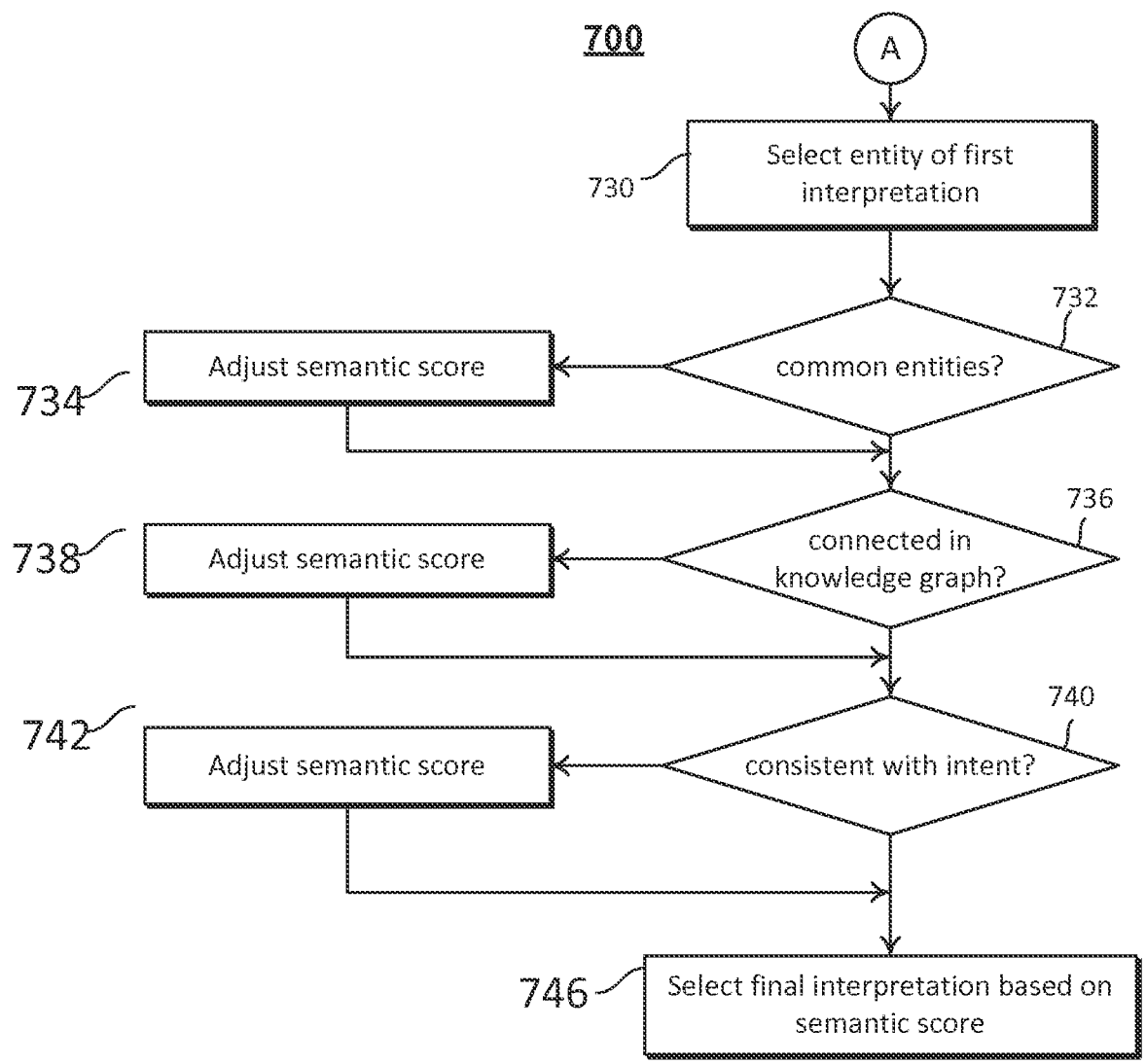

FIGS. 7A and 7B show a flow chart of a process 700 including illustrative steps involved in combining a plurality of interpretations of a voice-based input, in accordance with some embodiments of the present disclosure. In some embodiments, process 700 may be performed by control circuitry 304. In other embodiments, some steps of process 700 may be performed by a combination of control circuitry 304 and control circuitry 417 or 502, as is discussed in relation to FIG. 5. For example, automatic speech recognition module 504, entity classification module 506, and interpretation processing module 508 may be executed on remote server 502 and remotely accessed or controlled by control circuitry 304.

Process 700 may start at step 702, at which control circuitry 304 may receive a voice-based input from a user. The voice data may contain a predefined voice command (e.g., to denote that a voice command follows) as well as unrestricted and continuous speech uttered by the user. The speech data may be accompanied by control data, such as information related to a specific button that was pressed by the user on a remote control before or while providing the speech input. For example, the user may press a "search" button to perform a search for media assets corresponding to the voice-based input. In this case, the user's intent of performing a search may be determined from the control data rather than from the voice-based input and the user's intent may be used as contextual information by entity classification module 506 and interpretation processing module 508, as is discussed in relation to FIG. 5. Alternatively, the user may press an "action" button to execute a specific function with respect to a command represented by the voice-based input (e.g., to switch channels to a broadcast channel whose name is provided as part of the voice-based input).

In some aspects, control circuitry 304 may be available to receive voice-based input at any time, and may continuously look for events that designate the beginning of voice-based input (e.g., by continuously monitoring speech input received from a microphone). In other aspects, the reception of voice-based input may be preceded by a trigger, such as a search command issued by a user. In this case, control circuitry 304 may not need to monitor speech input continuously but rather may receive voice-based input only in response to receiving a trigger signal.

At step 704, in response to control circuitry 304 receiving the voice-based input, control circuitry 304 may process the voice-based input with an automatic speech recognition module, such as automatic speech recognition module 504. Control circuitry 304 may utilize various forms of speech recognition techniques, such as Hidden Markov Models (HMMs) or Support Vector Machines (SVMs) to obtain a plurality of interpretations from the voice-based input. In some aspects, each of the plurality of interpretations may correspond to a sequence of words that transcribe the voice-based input with a certain likelihood. In other words, each of the plurality of interpretations may be viewed as a hypothesized transcription of the voice-based input. Control circuitry 304 may further rank the plurality of interpretations such that they are ordered in decreasing order of likelihood (e.g., the most likely interpretation is listed first). In some embodiments, control circuitry 304 may further limit the plurality of interpretations to a predefined number, e.g., by keeping only the first five, ten, fifty, or one hundred interpretations after the ranking step. It should be understood that any suitable number of interpretations may be kept without departing from the scope of the present disclosure.

At step 706, control circuitry 304 may determine whether to process the voice-based input with another automatic speech recognition module to obtain further interpretations. In some aspects, control circuitry 304 may always process voice-based input with a predefined number of automatic speech recognition modules in order to obtain interpretations based on different types of speech processing. For example, a first automatic speech recognition module may use a different speech recognition algorithm than a second automatic speech recognition module. In some aspects, the various automatic speech recognition modules may be optimized for speakers from various geographical regions, or the speech recognition modules may be trained individually for each member of a family. Accordingly, processing the voice-based input with multiple automatic speech recognition modules may increase the likelihood that at least some of the plurality of interpretations have good speech recognition accuracy.

In some aspects, control circuitry 304 may determine at step 706 whether to process the voice-based input with another automatic speech recognition module. For instance, control circuitry 304 may first process the voice-based input with a general-purpose automatic speech recognition module. In response to processing the voice-based input, control circuitry 304 may determine that the recognition accuracy obtained from the general-purpose automatic speech recognition module does not exceed a predefined or dynamic threshold. In response to this determination, control circuitry 304 may determine that the voice-based input should be processed with another automatic speech recognition module. In contrast, if after processing the voice-based input with the first automatic speech recognition module, the recognition accuracy is deemed sufficient (e.g., because it exceeds the predefined or dynamic threshold), it may be determined that the voice-based input needs to be processed with another automatic speech recognition module.

At step 708, control circuitry 304 may assign entity sets to each of the plurality of interpretations generated by the one or more automatic speech recognition modules. In some aspects, control circuitry 304 may use entity classification module 506 to generate the entity sets. As is discussed in relation to FIG. 5, entity classification module 506 may in turn use entity database 512 and intent database 514 as part of assigning the entity sets. For example, in some aspects, entity database 512 and intent database 514 may contain listings of entities and intents that are available for assignment. Control circuitry 304 may cause the entities and intents in the list to be compared with words, terms, or portions of each of the plurality of interpretations. If control circuitry 304 determines that an entity or intent is contained in a given interpretation of the plurality of interpretations, the entity or intent may be included in an entity set that is associated with the given interpretation. Otherwise, the entity may not be included. Control circuitry 304 may use a comparison of text strings, or other suitable algorithms to perform this search and assignment process. In some aspects, control circuitry 304 may assign an entity even when a few of the characters differ between text contained in the interpretation and the entity or intent (e.g., if "1" is contained in entity database 512 but "one" is contained in the interpretation).

At step 710, control circuitry 304 may assign a semantic score to each of the plurality of interpretations. In some aspects, control circuitry 304 may assign the semantic score by determining whether entities in the entity set of a given interpretation are related to one another, e.g., if these entities are connected to one another in a knowledge graph, such as knowledge graph 600. If the entities are connected, then control circuitry 304 may assign a higher semantic score to the interpretation than if the entities are not connected, because the connection in the knowledge graph indicates that the entities may be combined in a meaningful manner. In some aspects, control circuitry 304 may assign a semantic score based on weights derived from the knowledge graph. For example, edges in the knowledge graph that connect two entities may be associated with a weight factor. A large weight factor may indicate a strong connection between the entities, for example, because a user would be likely to use both entities together in a voice-based input (e.g., two actors that frequently appear in similar movies). Conversely, a small weight factor may indicate a weak connection between the entities, for example, because a user would not be likely to use both of these entities together in a voice-based input (e.g., actors that are unlikely to appear together in movies).

In some aspects, control circuitry 304 may assign a semantic score based on entities associated with contextual information. For example, control circuitry 304 may continuously maintain a current context state that captures contextual information derived from previous user input. For instance, control circuitry 304 may keep track of entities contained in previously entered search queries and may determine whether the entities associated with the current context are likely to be combined by the user with entities associated with entities in a given interpretation. In some embodiments, control circuitry 304 may further compare entities contained in the entity set of a given interpretation with entities in a user profile. Control circuitry 304 may store entities that correspond to interests of the user. Accordingly, if an entity in the entity set of a given interpretation matches an entity in the user profile, control circuitry 304 may assign a higher semantic score than if the entity is not contained in the user profile.

At step 712, control circuitry 304 may rank the plurality of interpretations based on the semantic scores associated with each of the plurality of interpretations. In some aspects, the ranking may be performed in decreasing order of semantic score, such that the interpretation with the highest semantic score appears first. Control circuitry 304 may perform the ranking in order to eliminate interpretations that have a low likelihood of being accurate. For instance, control circuitry 304 may only retain a predefined number of interpretations that are ranked highest according to their semantic score. All remaining interpretations may be eliminated by control circuitry 304. In some aspects, control circuitry 304 may remove the interpretations with comparably low semantic score in order to reduce the computational complexity.

At step 714, control circuitry 304 may determine whether one or more of the ranked semantic scores exceeds a predefined or dynamic threshold. If control circuitry 304 determines that at least one of the semantic scores exceeds the predefined or dynamic threshold, the interpretation associated with the highest ranked semantic score may be determined to be sufficiently accurate and process 700 may terminate at 718. In some aspects, control circuitry 304 may use the identified interpretation to perform further actions or execute certain functions, such as performing a search based on the identified interpretation. If control circuitry 304 determines that none of the plurality of interpretations exceeds the predefined or dynamic threshold, control circuitry 304 may select a first interpretation in order to form a combination of that first interpretation with entities from a second interpretation or with entities associated with contextual information. Control circuitry 304 may select the first interpretation at step 716 by choosing the interpretation ranked highest in terms of semantic score. Alternatively or additionally, control circuitry 304 may select the first interpretation based on a user profile, specific entities associated with the plurality of interpretations, or other suitable factors.

At step 720, control circuitry 304 may determine whether contextual information is available. Control circuitry 304 may make this determination based on entities previously identified and stored as contextual information. In some aspects, the entities associated with the contextual information may be associated with timestamps that indicate a time when these entities were determined (e.g., based on previous user inputs). Control circuitry 304 may use these timestamps to determine whether the contextual information is still accurate.

If control circuitry 304 determines that contextual information is not available or not recent enough, control circuitry 304 may select a second interpretation from among the plurality of interpretations at step 722. Similar to the selection of the first interpretation, control circuitry 304 may select the second interpretation based on the ranked semantic scores associated with the plurality of interpretations, entities contained in a user profile, or a number or type of entities that are shared with the first interpretation. If control circuitry 304 determines at step 720 that contextual information is available and recent enough, control circuitry 304 may identify entities associated with the contextual information at step 724. For example, control circuitry 304 may retrieve all entities that are currently stored as contextual information and, when applicable, it may rank them according to their associated timestamps. In some aspects, control circuitry 304 may identify a predefined number of most recent entities that accurately capture the current context of the user's input. In some aspects, control circuitry 304 may retain all entities that are stored as contextual information regardless of their associated timestamps.

At step 726, control circuity 304 may generate a combined interpretation based on entities contained in the first interpretation and entities contained in either the second interpretation or entities identified to be part of contextual information. In some aspects, control circuitry 304 may generate the combined interpretation by aggregating all entities contained in the first interpretation and all entities contained in the second interpretation. Control circuitry 304 may keep track of repeated entities that occur both in the first interpretation and the second interpretation, because repeated entities may influence the computation of the semantic score of the combined interpretation. In other embodiments, control circuitry 304 may delete repeated entities and retain only one instance of such entities.

At step 732, control circuitry 304 may determine whether common entities are contained in the combined interpretation. Control circuitry 304 may make this determination by considering each of the entities contained in the combined interpretation and determining whether the considered entity occurs more than once in the combined form in the interpretation. For example, the combined interpretation may correspond to "Tom Cruise, Nicole Kidman, Tom Cruise, Nicole Kitman" and may have been generated from a first interpretation (e.g. "Tom Cruise, Nicole Kidman") and a second interpretation (e.g., "Tom Cruise, Nicole Kitman"). In this example, control circuitry 304 may determine that the entity "Tom Cruise" occurs twice whereas the entities "Nicole Kidman" and "Nicole Kitman" occur only once. In some aspects, control circuitry 304 may infer that because "Tom Cruise" was part of both the first interpretation and the second interpretation, it was likely recognized accurately by the automatic speech recognition module. Accordingly, in response to determining that the entity "Tom Cruise" occurs more than once, control circuity 304 may increase the semantic score of the combined interpretation at step 734.

At step 736, control circuitry 304 may determine whether there exist pairs of entities in the combined interpretation that are connected in a knowledge graph. If control circuitry 304 determines that such pairs exist, control circuitry 304 may increase the semantic score at 738. Otherwise, if no such pairs exist, control circuitry 304 may not adjust the semantic score associated with the combined interpretation. For example, prior to step 736, control circuitry 304 may have generated the combined interpretation "Tom Cruise, Nicole Kitman, Tom Cruze, Nicole Kidman" based on the first interpretation (e.g., "Tom Cruise, Nicole Kitman") and the second interpretation (e.g., "Tom Cruze, Nicole Kidman). For this example, control circuitry 304 may determine that the entities "Tom Cruise" and "Nicole Kidman" are connected in a knowledge graph. In response to making this determination, control circuitry 304 may increase the semantic score associated with this combined interpretation at step 738. It should be noted that neither the first interpretation (i.e., "Tom Cruise Nicole Kitman") nor the second interpretation (i.e., "Tom Cruze, Nicole Kidman") may have contained pairs of entities that are connected in the knowledge graph because one of the two entities was improperly recognized in either of the interpretations.

At step 740, control circuitry 304 may determine whether entities contained in the combined interpretation are consistent with an intent of the interpretation. If control circuitry 304 determines that the entities contained in the combined interpretation are consistent with an intent associated with the combined interpretation, control circuitry 304 may adjust the semantic score of the combined interpretation at step 742. Alternatively, if control circuity 304 determines that entities in the combined interpretation do not match an intent associated with the combined interpretation, control circuitry 304 may not adjust the semantic score. For example, in response to receiving the voice-based input "Show me movies with Tom Cruise and Nicole Kidman," control circuitry 304 may have associated a "search movies" intent with the combined interpretation. Control circuitry 304 may consequently determine that entities corresponding to actor names are consistent with such a "search movies" intent and, accordingly, control circuitry 304 may increase the semantic score of the combined interpretation at step 742. Alternatively, if a different intent, such as a "search sports" intent, had been associated with the combined interpretation, control circuitry 304 may have determined that the entities corresponding to actors names are not consistent with the "search sports" intent and therefore may not have adjusted the semantic score of the combined interpretation.

At step 746, control circuitry 304 may select an interpretation as the final interpretation based on the semantic scores associated with the plurality of interpretations and the semantic score associated with the combined interpretation. For example, based on the adjustments made at steps 734, 738 and 742, the semantic score associated with the combined interpretation may be greater than the semantic score of either the first interpretation or the second interpretation. In some aspects, control circuitry 304 may determine the final interpretation by selecting the interpretation with the highest semantic score from among the plurality of interpretations and the combined interpretation. In other embodiments, control circuitry 304 may determine the improvement of the semantic score associated with the combined interpretation. If the improvement in the semantic score exceeds a threshold, control circuitry 304 may determine that the combined interpretation should be selected; otherwise, control circuitry 304 may select an interpretation from among the plurality of interpretations. In yet other embodiments, control circuitry 304 may compare the semantic score of the combined interpretation with the predefined or dynamic threshold used at step 714. If control circuitry 304 determines that the adjusted semantic score of the combined interpretation exceeds the predefined or dynamic threshold, the combined interpretation may be used as the final interpretation. Otherwise, if control circuitry determines that the semantic score of the combined interpretation does not exceed the threshold, the interpretation ranked highest in terms of semantic score may be selected. Additionally, control circuitry 304 may provide an indication to the user or to subsequent processing circuitry that the desired level of accuracy (corresponding to the predefined or dynamic threshold) has not been met.

It is contemplated that the steps or descriptions of FIGS. 7A-7B may be used with any other embodiment of this disclosure. In addition, the steps and descriptions described in relation to FIG. 7A-7B may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIGS. 7A-7B.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for selecting an interpretation of a voice-based input, the method comprising:
   receiving, using control circuitry, the voice-based input;
   generating a first interpretation that matches the voice-based input and a second interpretation that matches the voice-based input;
   identifying a first entity set for the first interpretation and a second entity set for the second interpretation;
   assigning a first semantic score to the first interpretation and a second semantic score to the second interpretation;
   determining whether at least one of the first semantic score and the second semantic score exceeds a threshold;
   in response to determining that none of the first semantic score and the second semantic score exceed the threshold:
      generating a combined interpretation by combining the first interpretation and the second interpretation, wherein the combined interpretation includes one or more entities from the first entity set and one or more entities from the second entity set;
      counting a number of entities that are repeated in both the first entity set and the second entity set;
      generating, based on the count of the number of entities repeated in both the first entity set and the second entity set, a third semantic score assigned to the combined interpretation; and
      selecting one of the combined interpretation, the first interpretation, and the second interpretation based on the first semantic score, the second semantic score, and the third semantic score.

2. The method of claim 1, wherein each of the first interpretation and the second interpretation corresponds to a transcription hypothesis of the voice-based input.

3. The method of claim 1, wherein the third semantic score is determined based on whether a first entity in the first entity set is connected, in a knowledge graph, with a second entity in the second entity set.

4. The method of claim 1, wherein the third semantic score is determined based on comparing at least one entity in the first entity set or the second entity set with an entity derived from contextual information.

5. The method of claim 1, wherein the first and second interpretations are generated using a single automatic speech recognition method.

6. The method of claim 1, further comprising:
   processing the voice-based input using a first automatic speech recognition method to generate the first interpretation; and
   processing the voice-based input using a second automatic speech recognition method to generate the second interpretation.

7. The method of claim 1, wherein the third semantic score is determined based on comparing at least one entity in the first entity set or the second entity set with an entity associated with a user profile.

8. The method of claim 1, further comprising:
   receiving a user selection that identifies a final interpretation, wherein the final interpretation is one of the first interpretation, the second interpretation, and the combined interpretation.

9. A system for selecting an interpretation of a voice-based input, the system comprising:
   storage circuitry configured to receive the voice-based input; and
   control circuitry configured to:
      generate a first interpretation that matches the voice-based input and a second interpretation that matches the voice-based input;
      identify a first entity set for the first interpretation and a second entity set for the second interpretation;
      assign a first semantic score to the first interpretation and a second semantic score to the second interpretation;
      determine whether at least one of the first semantic score and the second semantic score exceeds a threshold;
      in response to determining that none of the first semantic score and the second semantic score exceed the threshold:
         generate a combined interpretation by combining the first interpretation and the second interpretation, wherein the combined interpretation includes one or more entities from the first entity set and one or more entities from the second entity set;
         count a number of entities that are repeated in both the first entity set and the second entity set;
         generate, based on the count of the count of the number of entities repeated in both the first entity set and the second entity set, a third semantic score assigned to the combined interpretation; and
         select one of the combined interpretation, the first interpretation, and the second interpretation based on the first semantic score, the second semantic score, and the third semantic score.

10. The system of claim 9, wherein each of the first interpretation and the second interpretation corresponds to a transcription hypothesis of the voice- based input.

11. The system of claim 9, wherein the third semantic score is determined based on whether a first entity in the first entity set is connected, in a knowledge graph, with a second entity in the second entity set.

12. The system of claim 9, wherein the third semantic score is determined based on comparing at least one entity in the first entity set or the second entity set with an entity derived from contextual information.

13. The system of claim 9, wherein each of the first interpretation and the second interpretation is obtained from a single automatic speech recognition method.

14. The system of claim 9, wherein the control circuitry is further configured to:
   process the voice-based input using a first automatic speech recognition method to generate the first interpretation; and
   process the voice-based input using a second automatic speech recognition method to generate the second interpretation.

15. The system of claim 9, wherein the third semantic score is determined based on comparing at least one entity in the first entity set or the second entity set with an entity associated with a user profile.

16. The system of claim 9, wherein the control circuitry is further configured to:
  receive a user selection that identifies a final interpretation, wherein the final interpretation is one of the first interpretation, the second interpretation, and the combined interpretation.

* * * * *